United States Patent [19]

Folger et al.

[11] Patent Number: 5,009,523

[45] Date of Patent: Apr. 23, 1991

[54] DOUBLE ROW BEARING ASSEMBLY

[75] Inventors: Russell F. Folger; Gerald P. Fox, both of Stark County, Ohio

[73] Assignee: The Timken Company, Canton, Ohio

[21] Appl. No.: 382,994

[22] Filed: Jul. 20, 1989

[51] Int. Cl.$^5$ .......................... F16C 19/38; F16C 33/66
[52] U.S. Cl. ..................................... 384/475; 384/564; 384/571
[58] Field of Search ............... 384/571, 564, 569, 585, 384/570, 560, 513, 404, 462, 465, 473, 474, 475; 74/467

[56] References Cited

U.S. PATENT DOCUMENTS

| | | | |
|---|---|---|---|
| 954,529 | 4/1910 | Lockwood | 384/571 |
| 2,019,464 | 10/1935 | Riblet | 384/571 X |
| 2,576,651 | 11/1951 | Super | 384/576 |
| 3,733,108 | 5/1973 | Petros et al. | 384/585 |

*Primary Examiner*—Daniel P. Stodola
*Assistant Examiner*—William G. Battista, Jr.
*Attorney, Agent, or Firm*—Gravely, Lieder & Woodruff

[57] ABSTRACT

A bearing assembly for supporting a shaft in a housing includes two single row tapered roller bearings mounted in axial alignment, yet in opposition. The first bearing is conventional, having the usual cup, cone and complement of tapered rollers. The second bearing has a conventional cone and complement of rollers which may be the same as their counterparts in the first bearing. However, the cup of the second bearing further has an integral axial extension which projects toward and abuts the back face of the cup for the first bearing. The two cones are separated by a spacer and are clamped between two radial abutments on the shaft, whereas the cup of the second bearing is clamped with respect to the housing such that it is incapable of shifting relative to the housing. This secures the entire bearing assembly in the housing.

22 Claims, 2 Drawing Sheets

DOUBLE ROW BEARING ASSEMBLY

BACKGROUND OF THE INVENTION

This invention relates to antifriction bearings and more particularly to a bearing assembly in which the rolling elements are arranged in two rows and are preset.

The tapered roller bearing has the capacity to carry heavy radial loads—and in that sense possesses the advantages of a cylindrical roller bearing—but unlike a cylindrical roller bearing, it possesses the further capacity to take heavy axial loads. It thus finds wide-spread use in machinery. Typical of such machinery are transmissions.

In its simplest form an antifriction bearing, whether it be a tapered roller bearing, an angular ball bearing or merely a cylindrical roller bearing, has an outer race, an inner race, some type of rolling elements arranged in a row between the races, and usually a cage or retainer to maintain the proper spacing between the rolling elements. Normally the outer race fits into a housing bore with one of its end faces against a shoulder in that bore, whereas the inner race fits over a shaft with one of its end faces against a flange or shoulder on the shaft or at least against some type of annular abutment that is along the shaft.

The tapered roller bearing lends itself to more complex configurations which are in essence combinations of single row bearings. For example, when two single row tapered roller bearings are oriented with their rollers in opposition, the overall assembly will accommodate axial loads in both directions. Of course, an axial load that is transmitted through a tapered roller bearing assembly must be transferred from the bearing assembly to the housing and likewise from the bearing assembly to the shaft, and various devices have been developed to effect this transfer—shoulders or abutments at the ends of the bearing assembly being the most common.

Sometimes it is more convenient to form a part with a simple through bore for holding the bearing. But a through bore will not in and of itself stabilize the bearing axially, that is accommodate axial loads. The Timken Company manufactures a single row tapered roller bearing which possesses a radially outwardly directed flange on its outer race, more commonly referred to as the cup, and this flange may be clamped against the end face of a housing containing a through bore, with the remainder of the cup located in the through bore. The flange, being solidly clamped against the housing, prevents the race from moving axially in the through bore.

In one type of truck transmission the output shaft is carried by two single row tapered roller bearings mounted in opposition—indeed in the indirect or X condition (FIG. 1). As such, the small diameter ends of the tapered rollers for the two rows are presented toward each other. Whereas the cones of the two bearings fit around the output shaft, the cups fit into a through bore in an end wall of the transmission case, and to facilitate assembly, the cups are often loose in the sense that no interference exists between the cup and the through bore. The cup on one of the bearings has a flange which is clamped against the end face of the wall through which the through bore passes. The cones, on the other hand, are clamped together on the shaft. Being mounted in opposition, the two bearings may be adjusted against each other to control the axial and radial clearance within the bearing, and this adjustment is derived from spacers which are between the two cups and the two cones. In this regard, the spacer between the two cones is a simple sleeve that is clamped up between those cones. It is normally not hardened. The spacer between the cups is somewhat more complex in that it has an annular oil groove and radially directed holes to admit oil from the groove to the space between the two bearings. It may or may not be hardened.

From the standpoint of manufacturing, the spacer located between the cups must be machined on its inner diameter, on its outer diameter and on both of its end faces. Also, an annular groove and radial oil holes must be added. Furthermore, the spacer must be hardened if the application requires it and, all surfaces must be ground. The cup spacer is a component in the current assembly which must be maintained in inventory by the bearing manufacturer for use when the bearing components are matched to obtain the proper bearing setting at the manufacturer's assembly area. With the current cup spacer, there are two possible wear surfaces—one along the conventional cup and the other along the flanged cup. In addition, the minimum overall width of the current bearing assembly is limited by the minimum cup spacer width which is dictated by the required annular groove and oil hole diameter.

The present invention eliminates many of the aforementioned concerns about the current bearing assembly. The invention resides in a bearing assembly which supports a shaft in the bore of a housing. The bearing assembly includes two single row bearings, each of which is capable of supporting axial as well as radial loads, and these bearings are mounted in opposition to each other. One of the bearings is conventional. The other has an integral extension at its one end, and that extension extends to and abuts the outer race of the conventional bearing to maintain the proper spacing between the two outer races. Indeed, the extension serves to maintain the proper spacing between the raceways of the two outer raceways, and in that sense replaces the cup spacer of a conventional bearing assembly. The invention also resides in the combination of the bearing assembly, a shaft and a housing, and in the unique bearing which forms part of the assembly.

DESCRIPTION OF THE DRAWINGS

In the accompanying drawings which form part of the specification and wherein like numerals and letters refer to like parts where they occur

DETAILED DESCRIPTION

Figure 1:
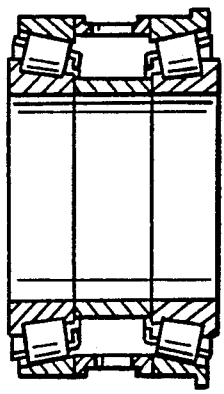
FIG. 1 is a sectional view of a bearing assembly of the prior art.

Referring now to the drawings (FIG. 2), a double row bearing assembly A supports a shaft B in a housing C so that the shaft B may rotate about an axis X of rotation. For example, the shaft B may be the output shaft of an automotive transmission and the housing C may be a part of the end wall for the transmission case. In any event, the shaft B has a bearing seat 2 and two abutments, one at each end of the seat 2. One abutment is a flange 4 that is formed integral with the shaft B, while the other is a drive flange 6 having a sleeve 8 which slides over a spline 10 on the end of the shaft B. The sleeve 8 is forced against the end of the bearing assembly A by a nut 12 which is threaded over the end of the shaft B and turned down against the flange 6. The housing C contains a through bore 14 which receives the bearing assembly A. As its name implies, the through bore 14 extends completely through the housing C without change in diameter. The housing C also contains an oil port 16 which leads up to the through bore 14, opening into it midway between its ends. Bolted against the outwardly presented face of the housing C is a clamping ring 18 which surrounds the sleeve 8 of the drive flange 6 and indeed carries a seal 20 which bears against the sleeve 8 of the drive flange 6.

The bearing assembly A consists of (FIG. 2) two single row tapered roller bearings 24 and 26 and a spacer 28 located between the bearings 24 and 26. Whereas the principal components of the bearings 24 and 26 are case hardened or through hardened steel, preferably the former, the spacer 28, while being machined from steel, is not hardened. The bearing 24 is conventional, whereas the bearing 26 is modified to render the entire bearing assembly A suitable for supporting the shaft B in the through bore 14 of the housing C.

Figure 3:
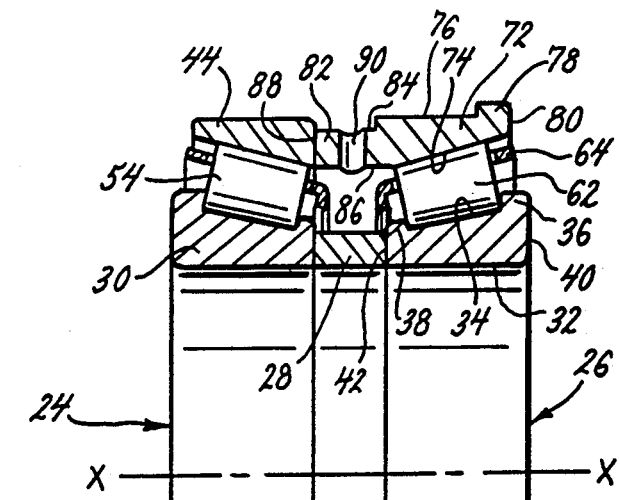
FIG. 3 is an enlarged sectional view of the bearing assembly of the present invention.

Being a conventional single row tapered roller bearing, the bearing 24 includes (FIG. 3) a cone 30 having a bore 32 through which the shaft B fits. Indeed, the diameter of the bore 32 is slightly smaller than the diameter of the shaft B, so that an interference fit exists between the two. The cone 30 also has an outwardly presented raceway 34 which is tapered, a thrust rib 36 at the large end of the raceway 34, and a retaining rib 38 at the small end. The two ribs 36 and 38 project outwardly beyond the raceway 34. The two ends of the cone 30 are squared off with respect to the axis X of rotation, there being a back face 40 at the thrust rib 36 and a front face 42 at the retaining rib 38. The cone 30 fits over the bearing seat 2 on the shaft B, with its back face 40 presented toward and being against the abutment ring 4.

In addition, the bearing 24 has a cup 44 provided with an inwardly presented tapered raceway 46, and an outwardly presented cylindrical surface 48. The raceway 46 and cylindrical surface 48 lead out to and merge with a back face 50 and a front face 52. Both of the faces 50 and 52 are squared off with respect to the axis X of rotation, with the former being at the small end of the tapered raceway 46 and the latter at the large end. The diameter of the cylindrical surface 48 is slightly less than the diameter of the through bore 14 in the housing C, so the cup 44 slides easily into the through bore 14, and indeed it is positioned around the cone 30 with its raceway 46 facing the cone raceway 34 and its back face presented away from the flange 4 on the shaft B.

Aside from the cone 30 and cup 44, the bearing 24, has tapered rollers 54 arranged in a single row between the raceway 34 of the cone 30 and the raceway 46 of the cup 44. The tapered side faces of the rollers 54 contact the raceways 34 and 46 of the cone 30 and cup 44, respectively, so that for all intents and purposes line contact exists between the two. The large diameter end faces, on the other hand, abut the thrust rib 36, and indeed the thrust rib 36 prevents the rollers 54 from being expelled from the annular space between the con 30 and cup 44. In this regard, the geometry of a tapered roller bearing is such that a load transmitted through the bearing induces a force which urges the rollers 54 up the taper of the two raceways 34 and 46, and that force would expel the rollers 54 were it not for the thrust rib 36. The rollers are "on taper" or "on apex", meaning that if each were extended to an apex, those apices would meet at a common point along the axis X. Of course, the tapered raceways 34 and 46, if extended to their respective apices would likewise meet at that point.

Finally, the bearing 24 has a cage 56 which fits around the row of rollers 54 and contains pockets through which the rollers 54 project. The cage 56 maintains the proper spacing between the rollers 54 of the single row and further retains those rollers around the cone 30 when the cone 30 is removed from the cup 44.

The other tapered roller bearing 26 (FIG. 3) is similar to the bearing 24 in the sense that it has a cone 60, tapered rollers 62 and a cage 64 which are identical to their counterparts in the bearing 24. However, the cone 60 is presented in the opposite orientation on the shaft B, that is with its back face 40 presented toward the drive flange 6. Thus, the small diameter ends of the rollers 62 for the bearing 26 are presented toward the small diameter ends of the rollers 54 for the bearing 24. Likewise, the front faces 42 of the two cones 30 and 60 face each other, but they do not contact, for the spacer 28 is interposed between them. The cones 30 and 60 fit snugly over the bearing seat 2 of the shaft B, owing to the interference fit between their bores 32 and the bearing seat 2. The sleeve 8 of the drive flange 6 bears against the back face 40 of the cone 60, and inasmuch as the nut 12 is turned down against the drive flange 6, the two cones 30 and 60 and the intervening spacer 28 are clamped firmly together on the bearing seat 2 between the integral flange 4 and the drive flange 6. They thus cannot migrate along or turn relative to the shaft B.

The bearing 26 likewise has a cup 70 (FIG. 3) which differs in several major respects from the cup 44 of the bearing 24, and these differences serve to distinguish the bearing 26 from the bearing 24. The cup 70 has a main body 72 provided with an inwardly presented tapered raceway 74, which surrounds the raceway 34 of the cone 60 and contacts the side faces for the rollers 54 that are located around the cone 60. The raceway 74 of the cup 70 and the raceway 34 of the cone 60, if extended to their respective apices, would have these apices located at a common point along the axis X of the bearing, and thus the rollers 62 of the bearing 26 are likewise "on apex". The main body 72 also has a cylindrical surface 76 which is equal in diameter to the cylindrical surface 48 of the conventional cup 44 and likewise will slide easily within the through bore 14 if unrestrained.

At that end of the cup 70 out of which the large end of the raceway 74 opens, the main body 72 merges into a flange 78 which projects radially outwardly beyond the cylindrical surface 76. Here the cup 70 has a front face 80 which is squared off with respect to the axis X. At the opposite end of the cup 70, the main body 72 merges into a cup extension 82 having a cylindrical outer surface 84, a cylindrical inner surface 86, and a back face 88 which extends between the two cylindrical surfaces 84 and 86. The inner surface 86 merges into the small end of the cup raceway 74 and thus equals the smallest diameter on the raceway 74. The diameter of the outer cylindrical surface 84 is less than the diameter of the cylindrical surface 76 on the main body 72 of the cup 70. The back face 88 is squared off with respect to the axis X of rotation. The cup extension 82 has radial holes 90 which extend completely through it and enable oil to flow into the interior of the bearing assembly A.

Thus, the main body 72 and the cup extension 82 are integrally united into a single component, which is, of course, the cup 70. The entire cup 70 is either through hardened or case hardened, preferably the latter. Thus, the back face 88 on the cup extension 82 constitutes a hard wear-resistant surface.

Figure 2:
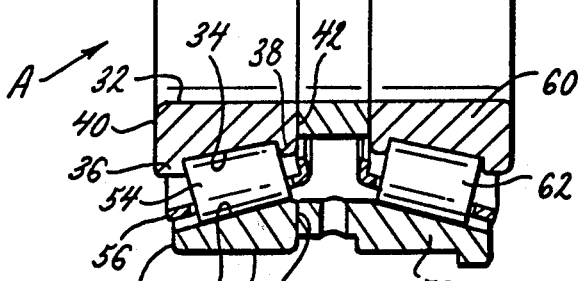
FIG. 2 is a sectional view of the bearing assembly of the present invention supporting a shaft in a housing.
Figure 2:
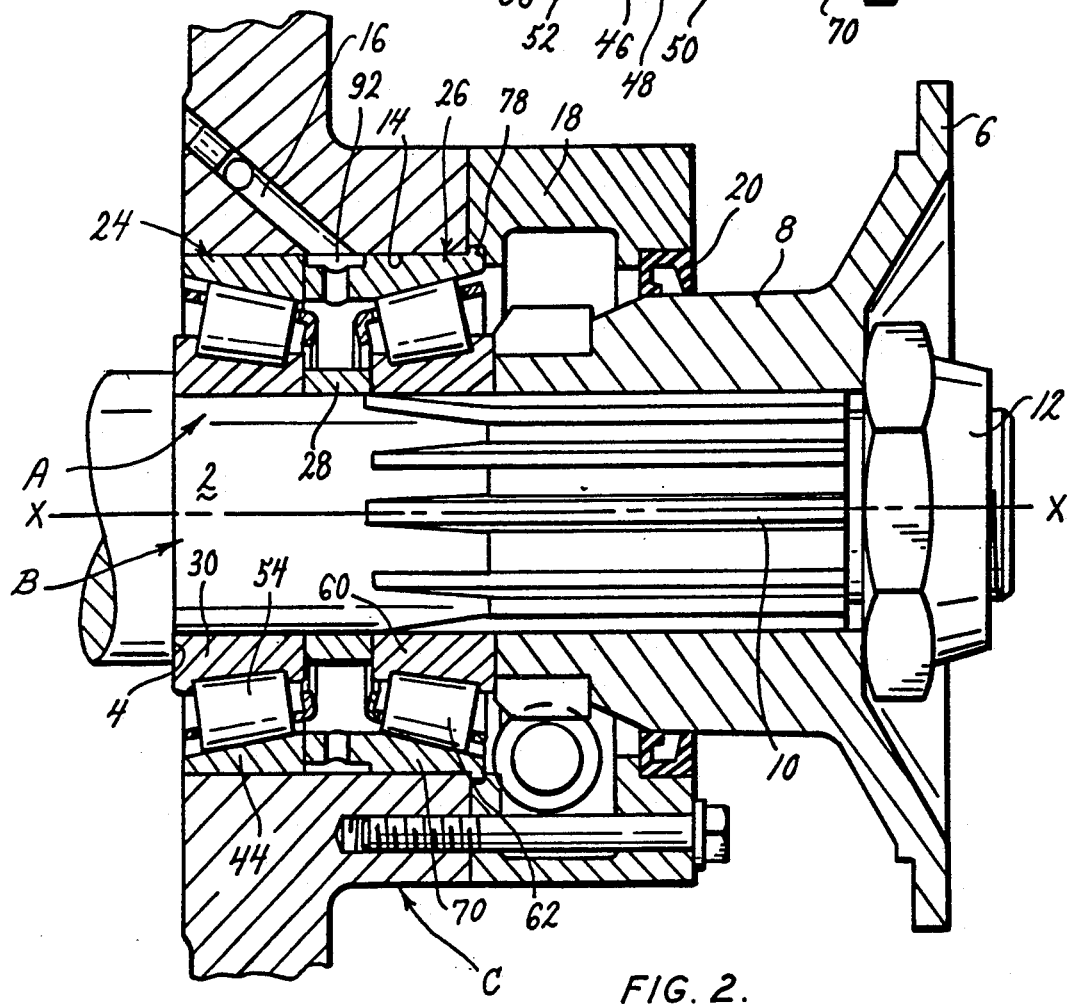

The cup 70, for the greater part, fits into the through bore 14 of the housing C—indeed, all of the cup 70 except the flange 78 is received in the through bore 14 (FIG. 2). The flange 78 fits between the end of the housing C and the clamping ring 18, which is bolted against the housing C, and this prevents the cup 70 from shifting axially or turning. When the cup 70 is so positioned, its raceway 74 is presented around the raceway 34 of the cone 60 and against the side faces of the tapered rollers 62. The cup extension 82, on the other hand, encircles the spacer 28 that is located between the two cones 30 and 60. Its back face 88 bears against the back face 50 of the other cup 44. Owing to the reduced diameter of the outer surface 84 on the cup extension 82, an annular cavity 92 exists between the cup extension 82 and the wall of the through bore 14. One side of the annular cavity 92 is enclosed by the main body 72 of the cup 70 and the other simply by the cup 44. The cavity 92 receives oil from the port 16 within the housing C, and distributes that oil to the oil holes 90, thus enabling the oil to enter the space between the small diameter ends of the tapered rollers 54 and 62.

The setting with which the bearing assembly A operates, whether it be end play or preload, is preset, and is, of course, dependent on the length of the spacer 28 and the length of the cup extension 82. It may be controlled or adjusted by grinding the end of the spacer 28 or the end of the cup extension 82, depending on whether one wants to increase or decrease end play or preload, whatever the setting of the bearing assembly A may be at the time. For example, grinding the back face 88 of the cup extension 82 will increase end play or reduce preload. On the other hand, grinding the end of the spacer 28 to reduce the length of the spacer 28 will decrease end play or increase preload. Being nonhardened, the spacer 28 is more easily ground to control the setting. As a practical matter, the spacer 28 is supplied with enough length to enable it to be ground down until the bearing assembly A has the correct setting.

To install the shaft B within the housing C such that it is supported on the bearing assembly A, the cone 30 of the first bearing 24 is forced over the seat 2 on the shaft B while the shaft B is removed from the housing C. The cone 30 comes to rest with its back face 40 snugly against the integral flange 4. Of course, the cone 30 carries the tapered rollers 54 and the cage 56 which holds them around the cone 30. Next, the cup 44 for the bearing 24 is fitted over the single row of rollers 54 that surrounds the cone 30, thus completing the bearing 24. The entire arrangement is then inserted into the through bore 14 of the housing C. The cup 44 slides easily into the through bore 14.

Once the bearing 24 assumes a position close to its normal operating position within the through bore 14, the spacer 28 is installed over the shaft B and is brought against the front face 42 of the cone 30. Next the cup 70 of the bearing 26 is passed over the shaft B, with its cup extension 82 leading, and is inserted into through bore 14. The cup 70 advances until its flange 78 seats against the end face of the housing C. Once the cup 70 is installed, the cone 60 is forced over the seat 2 or the shaft B until its front face 42 comes against the spacer 28. This completes the other bearing 26.

With the two bearings 24 and 26 in place within the through bore 14, the clamping ring 18 is bolted against the housing C to clamp the flange 78 of the cup 70 against the end face of the housing C. Since all of the components of the bearing assembly A are interlocked, the clamping ring 18 has the effect of securing the entire bearing assembly A within the through bore 14. Finally, the drive flange 6 is placed over the spline 10 on the shaft B and secured in place with the nut 12.

In operation, the cup 44 of the conventional bearing 24 may rotate slightly or creep in the through bore 14, but even though it is against the cup 70 of the other bearing 26, neither cup 44 nor the cup 70 experiences appreciable wear, inasmuch as their respective back faces 50 are hardened, such as by case hardening. The cup 70 is the only special component of the bearing assembly A, and it requires only a few additional machining operations, with minimum scrap, to manufacture. Certainly, the cup 70 with its extension 82, provides greater convenience than a separate cup and spacer as holds true with bearing assemblies presently used in transmissions.

In lieu of providing the extension 82 for the cup 70 with radially directed holes 90 to deliver oil to the interior of the bearing assembly A, the extension may have radially directed slots which extend axially into the extension 82 from the back face 88. The slots may be formed in a simple milling operation. Both the holes 90 and the slots may be considered apertures for directing oil to the interior of the bearing assembly A.

Figure 4:
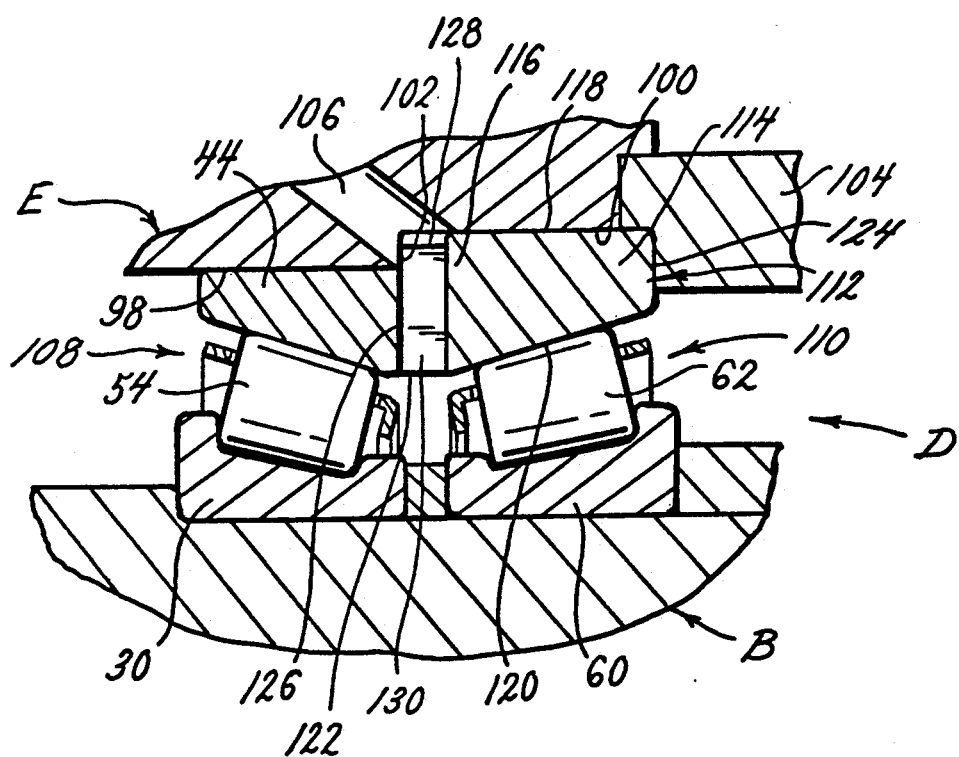
FIG. 4 is a sectional view of a modified bearing arrangement and housing.

The flange 78 on the cup 70 for the bearing 26 serves to locate the entire bearing assembly A axially within the through bore 14. It also provides the means for securing the bearing assembly A in the through bore 14, since the clamping ring 18 clamps down against it, capturing it between the end face of the housing C and the ring 18. A modified bearing assembly D (FIG. 4) is located and secured in a somewhat different manner, yet its setting is achieved in the same manner as with the bearing assembly A.

The bearing assembly D, while being mounted on the seat 2 of the shaft B, is contained in a housing E which differs somewhat from the housing C, in that it has a bore 98 and a counterbore 100 which meet at a shoulder 102. The counterbore 100 opens out of the housing E toward the drive flange 6, and here a clamping ring 104 is bolted against the housing E. The housing E contains a port 106 which opens into the counterbore 100 at the shoulder 102.

Like the bearing assembly A, the bearing assembly D has two single row tapered roller bearings 108 and 110 mounted in the indirect configuration. The bearing 108 is conventional and as such does not differ from the bearing 24, except perhaps in size. It thus has a cone 30, a cup 44 and tapered rollers 54. Its cup 44 fits into the bore 98 of the housing E. The other bearing 110 is to a large measure similar to the bearing 26 of the assembly A and indeed has a cone 60 and rollers 62 which are identical to their counterparts in the bearing 26—and in the bearing 24 as well—except perhaps as to size. The bearing 110 also has a cup 112 which differs from the cup 70 of the bearing 26 in that it is thicker and has no flange 78.

The cup 112 fits into the counterbore 100, but is slightly longer than the counterbore 100 so that it projects from it. It has a main body 114 and an extension 116 which is formed integral with the main body 114 and projects axially from it toward the shoulder 102. Along the main body 114 lies an outwardly presented cylindrical surface 118 which extends the full length of the main body 114 and may be slightly smaller in diameter than the counterbore 100. The main body 114 also has a tapered raceway 120 which is presented inwardly toward the cone 60 and at its small diameter end merges into an inwardly presented cylindrical surface 122 that lies along the extension 116. The large end of the raceway 120 runs out to a front face 124 that is squared off with respect to the axis X. At its opposite end the cup 112 has a back face 126 which lies along the cup extension 116 where it extends between the outer and inner cylindrical surfaces 118 and 122. The back face 126 is likewise squared off with respect to the axis X. The cup extension 116 has cylindrical outer surface 128 which is smaller than the outer surface of the main body 114. The extension 116 contains slots 130 which are milled into it from the back face 126 and extend radially from the outer surface 128 to the inner surface 122.

The cup 112 fits into the counterbore 100 with its back face 126 against the shoulder 102. The front face 124 lies beyond the counterbore 100 where the clamping ring 104 bears against it, the ring 104, of course, being secured to the housing E with suitable machine bolts. Thus, the cup 112 is clamped solidly between the shoulder 102 and the clamping ring 104. This serves to locate the entire bearing assembly D within the housing E.

Oil flows from the port 106 along the outer surface 128 of the extension and thence into the radial slots 130, through which it passes to the interior of the bearing assembly D, that is, into the annular space between the small ends of the two rows of tapered rollers 59 and 62.

This invention is intended to cover all changes and modifications of the example of the invention herein chosen for purposes of the disclosure which do not constitute departures from the spirit and scope of the invention.

What is claimed is:

1. In combination with a housing having a bore and a shaft which extends through the housing and has a pair of radially directed abutments and a bearing seat between the abutments, an improved bearing assembly for supporting the shaft between the abutments so that the shaft will rotate about an axis of rotation, said bearing assembly comprising: first and second bearings, each including an outer race having an inwardly presented raceway, an inner race having an outwardly presented raceway which faces the raceway of the outer race, and rolling elements arranged in a single row between the raceways of the outer and inner races, the raceways and rolling elements of each bearing being configured and oriented such that the bearing will transmit an axial load in one direction as well as a radial load, the outer races of the two bearings being in the bore of the housing, the inner races of the two bearings being on the bearing seat of the shaft, the bearings being oriented in opposition so that one transmits axial loads in one direction and the other transmits axial loads in the other direction, the outer race of the second bearing being captured in the housing so that it cannot shift axially with respect to the housing, the outer race of the second bearing further having an extension formed integral therewith and projected axially toward the outer race of the first bearing, the extension being against the outer race of the first bearing so as to position the outer race of the first bearing in a predetermined axial position with respect to the outer race of the second bearing, the extension on the outer race for the second bearing having an outer diameter that is less than the outer diameter of the remainder of the outer race for the second bearing and also less than the outer diameter for the outer race of the first bearing so as to provide an annular cavity between the two outer races, the extension having ports extended radially through it for enabling a fluent lubricant to pass from the annular cavity into the region between the inwardly and outwardly presented raceways of the two bearings.

2. The combination according to claim 1 wherein the bore is a through bore, the bearing assembly is in the through bore, and the second bearing has at one of its ends a flange which projects beyond the bore and is secured against the housing.

3. The combination according to claim 2 wherein the outer race of each bearing has an outer cylindrical surface which is substantially the same diameter as the diameter of the bore in the housing; and wherein the flange of the outer race for the second bearing projects beyond the cylindrical surface of that race;

4. The combination according to claim 1 wherein the outer races of the first and second bearings have hardened exterior surfaces.

5. The combination according to claim 1 wherein the races and rolling elements of the two bearings are case hardened.

6. The combination according to claim 1 wherein the first and second bearings are single row tapered roller bearings; and wherein the small diameter ends of the rollers for the first bearing are presented toward the small diameter ends of the rollers for the second bearing.

7. The combination according to claim 1 wherein interference fits exist between the inner races and the bearing seat on the shaft.

8. The combination according to claim 7 wherein the bearing assembly further comprises a spacer on the bearing seat between the two inner races for providing the bearing assembly with a predetermined setting; and wherein the spacer is not hardened.

9. The combination according to claim 1 wherein the ports are generally radially directed slots which open out of the end of the extension.

10. In combination with a housing having a bore and counterbore and with shaft which extends through the housing and has a pair of radially directed abutments and a bearing seat between the abutments, an improved bearing assembly for supporting the shaft between the abutments so that the shaft will rotate about an axis of rotation, said bearing assembly comprising: first and second bearings, each including an outer race having an inwardly presented raceway, an inner race having an outwardly presented raceway which faces the raceway of the outer race, and rolling elements arranged in a single row between the raceways of the outer and inner races, the raceways and rolling elements of each bearing being configured and oriented such that the bearing will transmit an axial load in one direction as well as a radial load, the outer race of the first bearing being in the bore of the housing and the outer race of the second bearing being captured in the counterbore of the housing, the inner races of the two bearings being on the bearing seat of the shaft, the bearings being oriented in opposition so that one transmits axial loads in one direction and the other transmits axial loads in the other direction, the outer race of the second bearing being captured in the housing so that it cannot shift axially with respect to the housing, the outer race of the second bearing further having an extension formed integral therewith and projected axially toward the outer race of the first bearing and serving to position the outer race of the first bearing in a predetermined axial position with respect to the outer race of the second bearing.

11. The combination according to claim 10 wherein the bore meets the counterbore at a shoulder; wherein a clamping ring is fastened to the housing where the counterbore opens out of the housing; and wherein the outer race of the second bearing is captured solidly between the shoulder and the clamping ring.

12. A bearing assembly for enabling one part to rotate relative to another part about an axis of rotation, said bearing assembly comprising: a first outer race having an inwardly presented raceway; a first inner race having an outwardly presented raceway which faces the raceway of the first outer race; first rolling elements arranged in a single row between the raceways of the first races, the first rolling elements and the raceways of the first races being configured and oriented such that the first rolling elements will transfer an axial force between the first races in one axial direction as well as a radial force; a second outer race axially aligned with the first outer race and having an inwardly presented raceway and an axially directed extension at its one end, the extension projecting toward and being against the end of the first outer race, the extension having an outer diameter less than the outer diameter of the remainder of the second outer race and less than the outer diameter of the first outer race so as to form an annular cavity between the two outer races, the second outer race having a hardened exterior surface located at least along its raceway and along the end of its extension where it contacts the first outer race; a second inner race axially aligned with the first inner race and having an outwardly presented raceway that faces the raceway of the second outer race; second rolling elements arranged in a single row between the raceways of the second outer and inner races, the second rolling elements and the raceways of the second races being configured and oriented such that the second rolling elements will transfer an axial force between the second races in one axial direction as well as a radial force, with the axial direction for the second races and rolling elements being opposite to the axial direction for the first races and first rolling elements.

13. A bearing assembly according to claim 12 wherein the second outer race has an outwardly directed flange at its other end.

14. A bearing assembly according to claim 13 wherein the first and second outer races have outwardly presented cylindrical surfaces which are substantially equal in diameter; and wherein the flange on the second outer race projects beyond the cylindrical surface of that race.

15. A bearing assembly according to claim 14 wherein the axial extension contains generally radially directed apertures which pass through it.

16. The bearing assembly according to claim 15 wherein the apertures which pass through the axial extension of the second outer race are generally radially directed slots that open out of the end of the axial extension.

17. A bearing assembly according to claim 14 wherein the cylindrical surface of the first outer race constitutes the greatest diameter of the first outer race.

18. A bearing assembly according to claim 17 wherein the first and second inner races are substantially identical.

19. A bearing assembly according to claim 18 and further comprising a spacer located between and axially aligned with the inner races to cooperate with the axial extension of the second outer race in establishing the setting for the bearing assembly.

20. A bearing for enabling one part to rotate relative to another part about an axis of rotation, said bearing comprising: a cup having an inwardly presented tapered raceway, an outwardly presented cylindrical surface, a flange at the end thereof where the tapered raceway has its greatest diameter, an integral axially directed extension at the end thereof where the tapered raceway has its smallest diameter, and slots extending generally radially through the extension and opening out of the end of the extension, the surface of the cup being hardened at least along the raceway and at the end of the extension; a cone located within the cup and having a bore, an outwardly presented tapered raceway which faces the cup raceway and is inclined in the same direction as the cup raceway, and outwardly directed ribs located at the ends of the raceway; and tapered rollers arranged in a single row between the raceways of the cup and cone.

21. A bearing according to claim 20 wherein the extension of the cup along its outwardly presented surface has a diameter less than the diameter of the cylindrical surface on the cup.

22. A bearing according to claim 20 wherein the cup is case hardened along the surfaces of its cup extension.

* * * * *